(12) United States Patent
Filipiak et al.

(10) Patent No.: US 9,264,166 B2
(45) Date of Patent: Feb. 16, 2016

(54) METHOD AND DEVICE FOR PROCESSING DATA AND COMMUNICATION SYSTEM COMPRISING SUCH DEVICE

(75) Inventors: Frank Filipiak, München (DE); Werner Kozek, Vienna (AT); Martin Kuipers, Dallgow-Döberitz (DE)

(73) Assignee: Nokia Siemens Networks OY, Espoo (FI)

(*) Notice: Subject to any disclaimer, the term of this patent is extended or adjusted under 35 U.S.C. 154(b) by 1212 days.

(21) Appl. No.: 13/000,065

(22) PCT Filed: Jun. 17, 2009

(86) PCT No.: PCT/EP2009/057527
§ 371 (c)(1),
(2), (4) Date: Jan. 13, 2011

(87) PCT Pub. No.: WO2009/153284
PCT Pub. Date: Dec. 23, 2009

(65) Prior Publication Data
US 2011/0122920 A1     May 26, 2011

(30) Foreign Application Priority Data

Jun. 20, 2008 (EP) ..................................... 08104490

(51) Int. Cl.
*H04K 1/10*          (2006.01)
*H04J 13/10*         (2011.01)
(Continued)

(52) U.S. Cl.
CPC .............. *H04J 13/105* (2013.01); *H04J 13/004* (2013.01); *H04L 5/0016* (2013.01); *H04M 11/062* (2013.01)

(58) Field of Classification Search
CPC ............... H04B 2203/5495; H04B 2203/5483; H04B 3/54; H04W 16/14; H04W 28/08; H04L 5/0007; H04L 12/2878; H04L 1/0017; H04L 2012/6478; H04L 27/2601; H04L 41/0213; H04L 5/023; H04L 69/14; H04M 11/062
USPC ......... 375/261, 267, 271, 298, 300, 302, 320, 375/322, 353, 140, 141, 146, 222, 346, 347, 375/348, 255, 130; 708/250, 252, 53; 455/501, 63.1, 114.2, 296
See application file for complete search history.

(56) References Cited

U.S. PATENT DOCUMENTS 3,715,508 A * 2/1973 Blasbalg ........................ 370/203
4,852,144 A * 7/1989 Cole ............................... 379/11
(Continued)

FOREIGN PATENT DOCUMENTS

WO    2005034459 A1    4/2005
WO    2007145640 A1   12/2007

OTHER PUBLICATIONS

ITU-T G.993.2 Telecommunication Standardization Sector of ITU (Feb. 2006) "Series G: Transmission Systems and Media, Digital Systems and Networks, Digital sections and digital line system—Access networks, Very high speed digital subscriber line transceivers 2 (VDSL2)", ITU-T Recommendation G.993.2.
(Continued)

*Primary Examiner* — Rahel Guarino
(74) *Attorney, Agent, or Firm* — Laurence A. Greenberg; Werner H. Stemer; Ralph E. Locher

(57) ABSTRACT

A method and a device are provided for processing first data, wherein said first data are distributed, in particular temporally spread over and/or on top of second data. In addition, a communication system comprising such device is suggested.

11 Claims, 4 Drawing Sheets

(51) Int. Cl.
*H04J 13/00* (2011.01)
*H04L 5/00* (2006.01)
*H04M 11/06* (2006.01)

(56) References Cited

U.S. PATENT DOCUMENTS

| | | | | |
|---|---|---|---|---|
| 5,586,113 | A | * | 12/1996 | Adachi et al. ............... 370/342 |
| 5,956,624 | A | * | 9/1999 | Hunsinger et al. ............ 455/65 |
| 6,188,669 | B1 | | 2/2001 | Bellenger |
| 6,658,076 | B1 | * | 12/2003 | Hayata ....................... 375/377 |
| 7,782,889 | B2 | | 8/2010 | Kozek et al. |
| 7,852,869 | B2 | * | 12/2010 | Clausen ..................... 370/441 |
| 8,102,923 | B2 | * | 1/2012 | Gorokhov et al. ........... 375/242 |
| 8,446,892 | B2 | * | 5/2013 | Ji et al. ...................... 370/343 |
| 2002/0118766 | A1 | | 8/2002 | Mitlin et al. |
| 2003/0112763 | A1 | * | 6/2003 | Liu et al. .................... 370/252 |
| 2004/0190640 | A1 | * | 9/2004 | Dubuc et al. ................ 375/260 |
| 2005/0013379 | A1 | | 1/2005 | Duvaut et al. |
| 2005/0175070 | A1 | * | 8/2005 | Grob et al. .................. 375/141 |
| 2005/0177853 | A1 | * | 8/2005 | Williams et al. .............. 725/81 |
| 2006/0233124 | A1 | | 10/2006 | Palanki |
| 2007/0140286 | A1 | * | 6/2007 | Kraus ......................... 370/419 |
| 2011/0293023 | A1 | * | 12/2011 | Wu et al. ..................... 375/259 |

OTHER PUBLICATIONS

Mills, David L., "Network Time Protocol (Version 3) Specification, Implementation and Analysis" University of Delaware, Mar. 1992, Network Working Group, Request for Comments: 1305, Obsoletes RFC-1119, RFC-1059, RFC-958.

Jungnickel, Dieter, "Finite Fields: Structure and Arithmetics", B.I.-Wissenschaftsverlag, Mannheim, 1993.

IEEE 1588, IEEE Standard for a Precision Clock Synchronization Protocol for Networked Measurement and Control Systems—IEEE Instrumentation and Measurement Society, Sponsored by the TC9-Technical Committee on Sensor Technology IEEE Standards Nov. 8, 2002.

* cited by examiner

METHOD AND DEVICE FOR PROCESSING DATA AND COMMUNICATION SYSTEM COMPRISING SUCH DEVICE

BACKGROUND OF THE INVENTION

Field of the Invention

The invention relates to a method and to a device for processing data and to a communication system comprising such device.

The evolution of DSL technology is characterized by achieving higher bit-rates by broadening of the transmission bandwidth. Since both loop attenuation and crosstalk are increasing with frequency more sophisticated measures are necessary to be provided at the DSL transmitter and the DSL receiver.

Currently deployed VDSL2 systems already use bandwidth up to 17 Mhz, while the ITU-993.2 standard suggests a bandwidth of up to 30 Mhz. A typical target bit rate of, e.g., 100 Mbit/sec (amounting to a bidirectional net data rate of 200 Mbit/sec) at a loop length of 0.8 km to 1 km cannot be achieved by current transceiver technology. Crosstalk reduction leads to an increase of reach (maximum admissible loop length at a given rate) or an increase of data rate (at given loop length) or it may result in an increased stability of a "living loop plant" situation (i.e. CPEs turned off and on causing fluctuating crosstalk).

The VDSL2 standard is similar to the legacy ADSL standard, i.e., it has a baseband FFT-based multicarrier QAM-modulation that is adapted to the loop condition. As such the VDSL2 standard follows a so-called "leased line philosophy" according to which the internal bit rate of the DSL link is kept constant and does not adapt to the actual user traffic. This, however, is in contrast to many modern communication systems used in wireless applications and even to the Ethernet application where the line is almost quiet if there is no user traffic.

FIG. 1 shows a traffic simulation assuming three high-definition IPTV channels providing a stationary floor of about 40 Mbit/sec and typical bursts of IP traffic resulting from web browsing applications with peak data rates of more than 100 Mbit/sec.

BRIEF SUMMARY OF THE INVENTION

The problem to be solved is to overcome the disadvantages stated above and in particular to enable a bitrate improvement even for a frequency range with poor signal-to-noise ratio that is able to cope with traffic peaks.

This problem is solved according to the features of the independent claims. Further embodiments result from the depending claims.

In order to overcome this problem, a method is provided for processing first data, wherein said first data are distributed, in particular temporally spread over and/or on top of second data.

Preferably, said first data may be temporally spread over and/or on top of said second data in the sense of switching DMT symbols on and off.

In a multi-user scenario, the bursts of IP traffic can be handled by statistical multiplexing which allows for an aggregation ratio of up to 1:50 without noticeable performance degradation. It is one of advantages of the approach provided herein to utilize such multiplexing gain based on the bursts of said IP traffic. In addition, higher peak rates enable bandwidth efficient retransmission methods to deal with the impulse noise problem which is currently the highest risk for widespread IPTV adoption particularly for carriers with poor in-house cabling environments.

In an embodiment, said second data are modulated and in particular said second data comprise DMT symbols.

In another embodiment, the first data is distributed according to an initial pseudo-random code.

In a further embodiment, said initial pseudo-random code is extended to a pseudo-random orthogonal code, in particular an orthogonal 0/1-valued hierarchical code in a multi-user DSL scenario.

DSL stands for all kinds of digital subscriber lines comprising existing DSL standards as well as upcoming DSL standards.

In a next embodiment, said pseudo-random code is a hierarchical code in particular comprising a binary tree structure.

Hence, the pseudo-random code is structured in a hierarchical way that efficiently allows prioritizing. For example, a first subscriber gets a code of a high level within a tree structure and a second subscriber gets a few codes at the bottom of the tree way below said high level: Referring to the same tree level, the code of the first subscriber corresponds to a lot more ones than zeros than the number of ones assigned to the second subscriber. As the number of ones determines an occurrence of data packets to be conveyed, the first subscriber is entitled to receiving more data packets and thus obtains a higher data rate. This scheme can be used both for pure upstream and/or downstream direction(s) depending on the required service level.

It is also an embodiment that a portion of said first data can be prioritized by being associated with a certain hierarchical stage of said pseudo random code.

Pursuant to another embodiment, the method comprises the steps:

identify lines that interfere with one another and
provide mutually orthogonal pseudo-random codes for such lines that show significant interference, thus in particular avoiding such interference by temporally non-overlapping usage of DMT symbols.

According to an embodiment, said significant interference is a value of interference above a given threshold value.

Hence, the lines that are subject to noise or disturbance of any kind, in particular interference, may be provided with such pseudo-random codes in order to improve the data rate over such lines.

According to another embodiment, said first data is temporally distributed over and/or on top of said second data.

In yet another embodiment, said first data utilizes a first frequency range and said second data utilizes a second frequency range on top of the first frequency range.

According to a next embodiment, said first data comprises data distributed over several lines and/or ports.

Pursuant to yet an embodiment, said lines or ports are associated with a line-card or with a DSLAM.

It is another embodiment that said first data are utilized for in-band clock synchronization between different DSLAMs and/or different line cards.

Another embodiment states that said first data are utilized for synchronizing a clock signal via quiet line noise registration.

According to an additional embodiment, said first data are utilized for synchronizing a clock signal via a powerline or a wireline or wireless connection.

The problem stated above is also solved by a device comprising a and/or associated with a processor unit and/or a hard-wired circuit and/or a logic device that is arranged such that the method as described herein is executable thereon.

According to an embodiment, said device is a or is associated with a communication device, in particular with a line card or a DSLAM.

The problem stated supra is further solved by a communication system comprising the device as described herein.

Embodiments of the invention are shown and illustrated in the following figures:

DESCRIPTION OF THE INVENTION

The approach suggested utilizes in particular a pseudo-random orthogonal code for traffic spreading over DMT symbols.

Multi-user communication over an interference-limited communication channel may utilize some form of (Hilbert space) orthogonality between the users. Such orthogonality can be obtained by a disjointness in time and/or frequency, the corresponding multiple access schemes are known as time-division multiple access (TDMA) or frequency division multiple access (FDMA).

However, orthogonality can also be achieved by fully time-frequency-overlapping signals, the most prominent example is a so-called code-division multiple access (CDMA) which underlies the legacy North American cellular system IS-95.

The approach provided utilizes in particular orthogonal 0/1-valued pseudo-random codes in said multi-user DSL scenario. In particular, the solution may not introduce any temporal spreading of signals rather than temporally spreading the traffic onto DMT symbols without having to change the DMT modulation format.

This may be achieved by defining a tree-structured traffic distribution code by an indicator function as follows:

$$g_{k,l}(n) = \begin{cases} 1 & \text{the } n\text{-th block of partial } DMT \text{ symbols of port } k \text{ contains data} \\ 0 & \text{the } n\text{-th block of partial } DMT \text{ symbols is suppressed} \end{cases} \quad (1)$$

Figure 1:
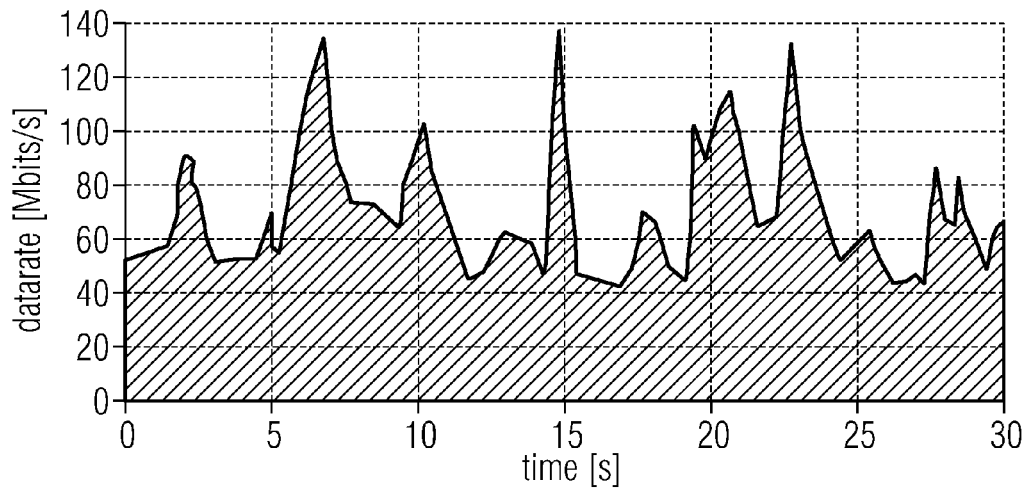
FIG. 1 shows a traffic simulation with three high-definition IPTV channels.
Figure 2:
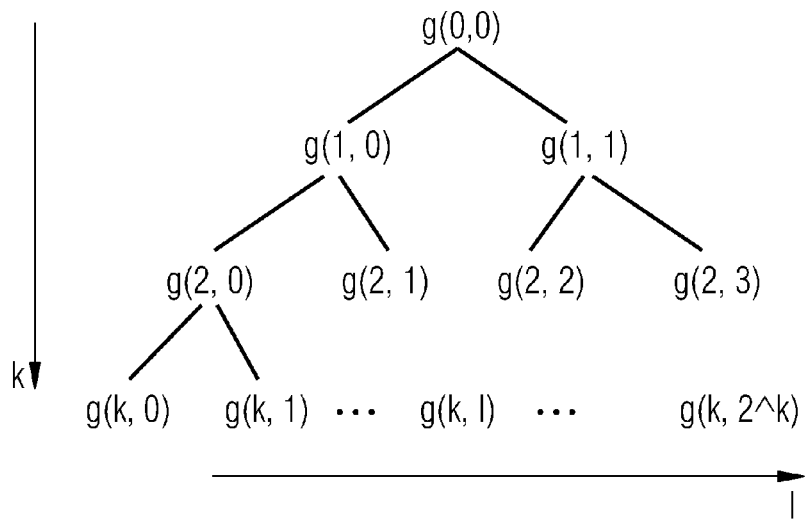
FIG. 2 shows a code tree according to an indicator function, wherein the code generated being hierarchic and allows prioritizing.

Here, the index k stands for the vertical tree index (branching stage) and l is the horizontal tree index (branch) (see FIG. 2).

A block of partial DMT symbols means that
(i) a number of DMT symbols is added or packed into one block (depending on a DSLAM and/or a line-card granularity and other practical requirements) and
(ii) a frequency interval or a subset of tones from the power switching according to $g_{k,l}(n)$ is excluded. A particular example for such an exclusion can be a band between 17 Mhz and 30 Mhz. Such scenario may lead to a spectrum usage according to FIG. 3.

The length of the pseudo-random code may provide a power of 2 with the exponent given by a tree height K:

$$N = 2^K \quad (2)$$

Any usual (balanced) pseudo-random sequence of length N can be taken as the starting point for the code constructions, e.g. shift-register sequences based on irreducible polynomials in a GF(2) (see [2]).

The root code preferably corresponds to a unity signal:

$$g_{0,0}(n) = 1, 0 \le k < N \quad (3)$$

After k-th branching, the number of active DMT symbols is halved compared to the previous state:

$$\sum_{n=0}^{N} g_{k,l}(n) = 2^{K-k}, \quad 0 \le k < N \quad (4)$$

Two different code words on the same tree level are mutually disjoint (which means that the associated transmission signals are mutually orthogonal):

$$\sum_{n=0}^{N} g_{k,l}(n) g_{k,l'}(n) = 2^{K-k} \delta(l, l'), \quad 0 \le k < N \quad (5)$$

All code words on the same tree level are complementary in the sense that summing up results in the unity signal $$\sum_{l=0}^{K-1} \sum_{n=0}^{N} g_{k,2l-1}(n) \equiv 1. \quad (6)$$

Concerning the mapping between users and/or ports and codes, the following is noted:
a. Priority: Each port does not have to be on the same branching stage of the tree. If, e.g., some user has a higher service level agreement, a higher level code in the tree could be assigned to such user.
b. Scheduling: On a typical DSL line-card and/or a DSLAM an Ethernet/ATM-based traffic aggregation stage may already be deployed which has to perform some multi-user and/or multiport scheduling tasks. This traffic aggregation processing stage can be connected to the spectrum management method (cross-layer design) provided herewith. Hence, the traffic aggregator assigns code symbol to ports. This information has to be transferred to an actual transceiver chipset.
c. Overbooking: The number of users can be significantly higher than the number of ports because of (i) a statistical multiplexing gain within typical IP traffic, and (ii) some users may be a priori interference free (e.g., because their loops are fed to different cables).
d. Vectoring: If the overbooking ratio exceeds the previously mentioned requirements, DSM L3 (vectoring) still may remain a last chance to avoid traffic interference.
Synchronization
Synchronization may be required in order to ensure a non-overlapping of DMT symbols. However, the precision requirements are simplified by the fact that (i) a Signal-to-Interference Ratio (SIR) is typically beyond 30 dB (interferers are relatively weak compared to other multiple access situations); and (ii) a certain amount of overlap between DMT symbols leads only to a linear decrease of effective SIR after QAM decision (the energy of single QAM symbol is substantially evenly distributed over the DMT-frame length).

Hereinafter, synchronization methods for the approach provided are summarized regarding the scenario of Multi-DSLAM spectrum management:

a. Blind:
  There is no dedicated physical connection between the DSLAMs. Clock recovery is based on continuous registration of Quiet Line Noise (QLN) (inactive loops before initial training) or on Signal-to-Noise Ratio (SNR) during data transmission thereby exploiting the undesired wireless connection between the loops, i.e., the near-end crosstalk.

b. Inband Ethernet:
  Basically, the Ethernet protocol may be unsynchronized, but there is a tradition to include clock synchronization mechanisms up to a very high degree of precision (see, e.g. RFC 1305, IEEE 1588). It is noted that there are some specifics whenever an Ethernet frame is encapsulated into a DSL physical layer, which, however, can be handled by software-measurements.

c. Powerline:
  In the typical VDSL2 rollout, a Fiber-To-The-Curb (FTTC)-scenario may apply where the DSLAMs are situated in some sort of shelter with standard electrical power connection. This power connection can be used for clock distribution between different DSLAMs of different carriers and/or vendors.

d. External (Wireline or Wireless):
  A dedicated physical connection can be used for clock synchronization purposes. This may require hardware level cooperation between DSLAM vendors. The actual physical connection can be a low-rate wireless (e.g., Zigbee, WLAN, etc.), a wireline or a GPS-based connection.

FIG. 2 shows a code tree according to the indicator function (1). The code generated is hierarchic and allows prioritizing. The tree may also have an arbitrary root point.

Figure 3:
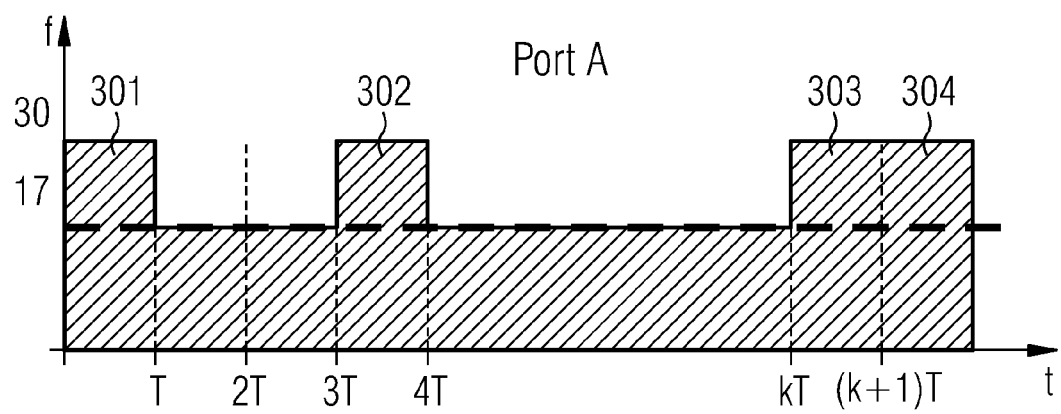
FIG. 3 shows two ports A and B of a DSLAM or line card conveying traffic to a respective CPE, wherein a bandwidth up to 17 MHz is occupied by a base traffic of a leased line and additional traffic is provided on top of the 17 MHz bandwidth up to an exemplary frequency amounting to 30 MHz.
Figure 3:
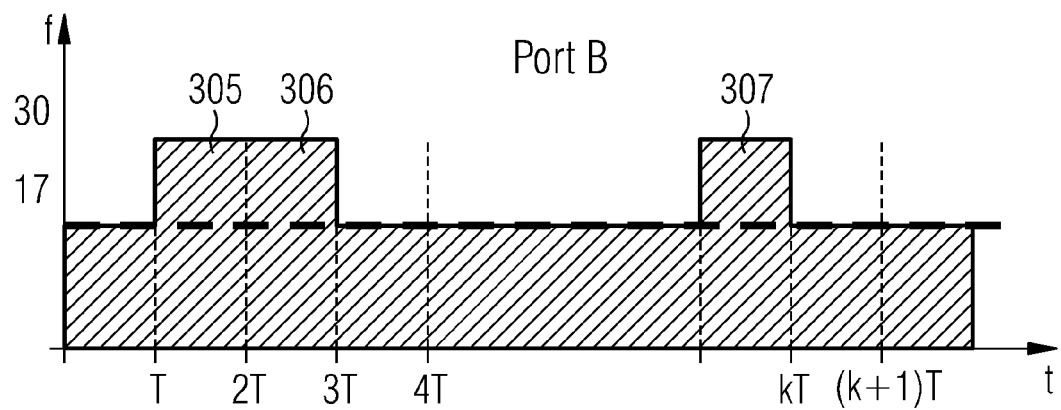

FIG. 3 shows two ports A and B of a DSLAM or line card conveying traffic to a respective CPE. A bandwidth up to 17 MHz is occupied by a base traffic of a leased line according to, e.g., VDSL2. Additional traffic is provided on top of the 17 MHz bandwidth up to an exemplary frequency amounting to 30 MHz resulting in additional 13 MHz bandwidth which is used in one embodiment of the approach provided herewith.

Hence, a data unit 301 has a frequency bandwidth on top of said 17 MHz up to 30 MHz and comprises, e.g. 2000-4000 samples corresponding to a DMT symbol length (e.g. a full FFT duration required for such one symbol). The duration of said data unit 301 corresponds to the duration of an Ethernet packet.

The time period starting at t=0 and lasting until a time k is reached corresponds in particular to a cycle period used for the code generated.

According to data unit 301, further data units 302 to 307 are added to the base traffic of the leased lines of ports A and B. The way to arrange or distribute said data units 301 to 307 on top of the base traffic is based on the pseudo-random code generated. Thus, the data units 301 to 307 use mutually orthogonal symbol sequences to one another.

The scenario of FIG. 3 may in particular be applicable for upstream as well as for downstream traffic.

Figure 4:
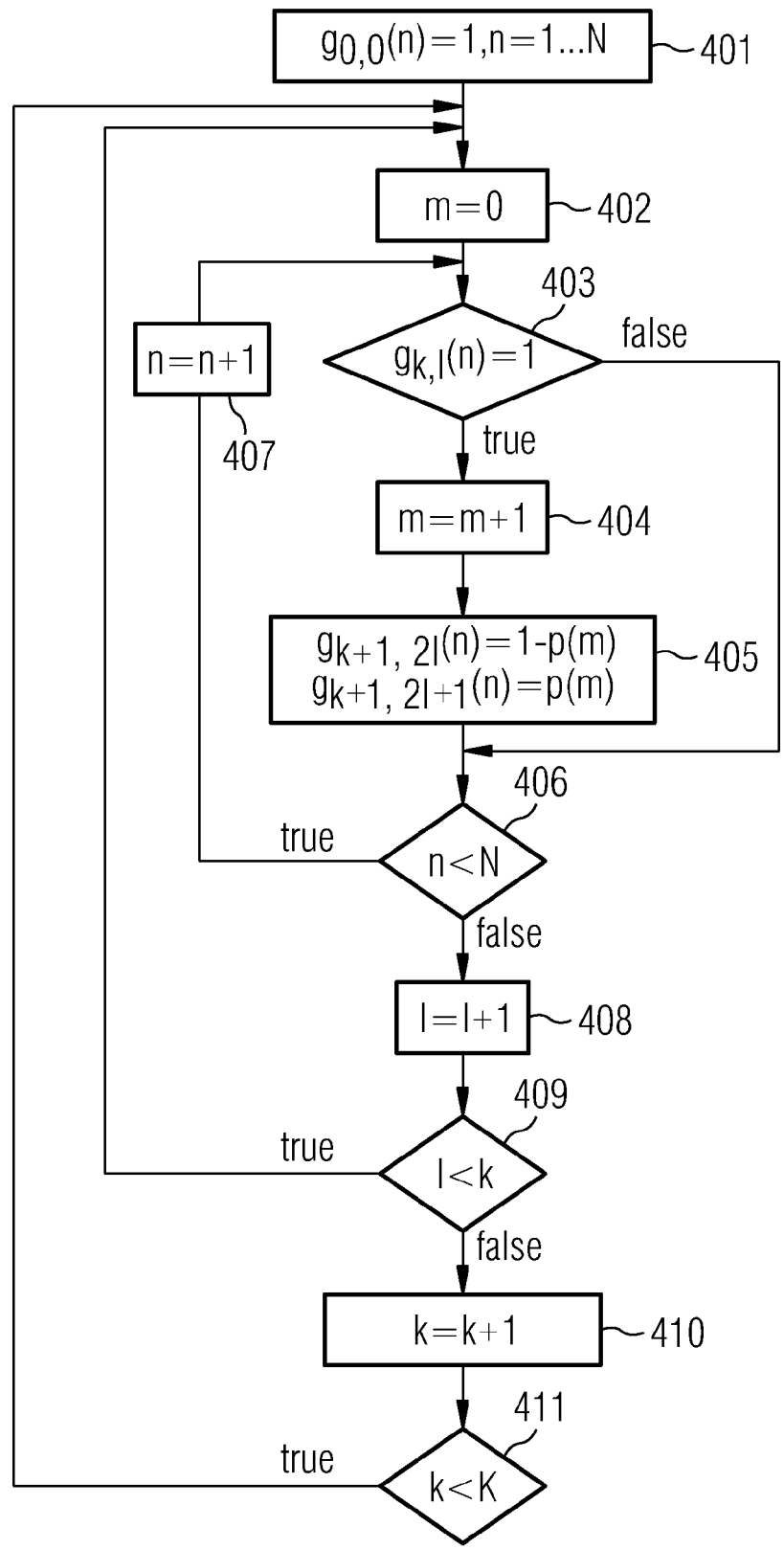
FIG. 4 shows a flow chart as how to generate the pseudo-random orthogonal code.

FIG. 4 shows a flow chart as how to generate the pseudo-random orthogonal code. In a step 401 an initialization is done according to $$g_{0,0}(n)=1, n=1, \ldots, N$$

and in a step 402 m is set to 0.

In a step 403 it is checked whether $$g_{k,l}(n)=1.$$

If this is the case, it is branched to a step 404 incrementing m (m=m+1) and further processing to a step 405:

$$g_{k+1,2l}(n)=1-p(m)$$

$$g_{k+1,2l+1}(n)=p(m)$$

p(m) is a pseudo-random sequence which defines the root of all codes (i.e. an identical number of "0"s and "1"s, but randomly distributed). m and n are denoted a time-index within each binary code, whereas k and l denote overall indices. The method provided traverses the code tree for each time index, in particular because for each point in time a code needs to be defined.

After step 405 it is checked in a step 406 whether n<N. Also, if step 403 is provides a false result, it is branched to said step 406. In case n<N, it is branched to a step 407 incrementing n (n=n+1) and continuing with step 403. If n<N is false, l is incremented (l=l+1) in a step 408 and next in a step 409 it is checked whether l<k. If such is true, it is branched to step 402. Otherwise, in a step 410 k is incremented (k=k+1) and in a subsequent step 411 it is checked whether k<K. If this is true, it is branched to step 402, otherwise the method may terminate.

Figure 5A:
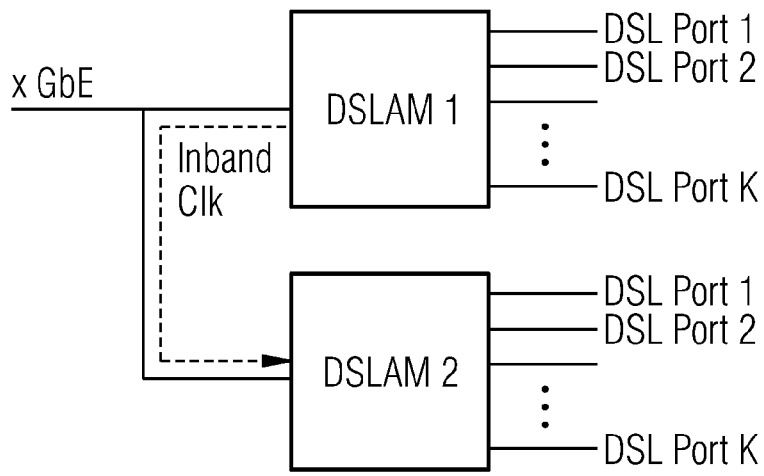
FIG. 5 shows two examples for synchronizing a clock signal between two DSLAMs.
Figure 5B:
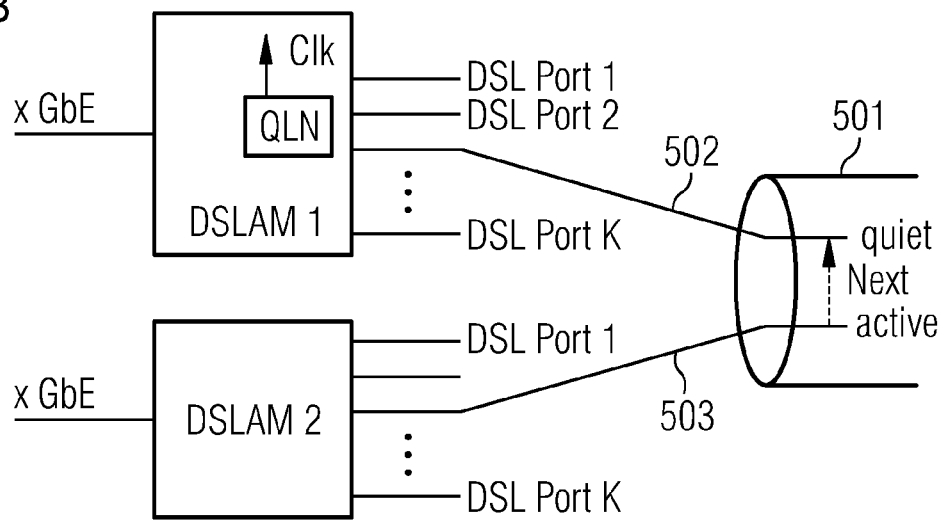

FIG. 5 shows two examples for synchronizing a clock signal between two DSLAMs.

According to example (a) both DSLAMs are fed by one Gigabit Ethernet line providing an inband clock signal to both DSLAMs. Each DSLAM has a number of K ports.

In an example (b), each DSLAM is fed by a separate Gigabit Ethernet line. DSLAM 2 provides via one of its ports 503 a clock signal to a cable binder 501 to which also at least one port 502 of DSLAM 1 is connected. In particular with the line of port 502 being quiet, near-end crosstalk (NEXT) from port 503 to port 502 can be used to determined the clock signal and thus utilize such clock signal for synchronization purposes (quite line noise registration).

Further Advantages:

The approach introduces a tree-structured traffic spreading method for DSL systems resulting in particular in simplified synchronization requirements between DSLAMs and as such can be easily used across DSLAMs in a multivendor and/or multicarrier scenario. Synchronization can be performed either in a blind (crosstalk-induced) or in an inband Ethernet approach.

An exemplary embodiment of this approach can be provided in or together with a cross-layer modulation concept introduced in [1], where the necessary power reduction of DMT symbols is realized by binary precoding rather than explicit change of modulation gains.

REFERENCES

[1] WO 2005/034459
[2] D. Jungnickel, "Finite Fields: Structure and Arithmetics", B.I.-Wissenschaftsverlag, Mannheim, 1993.

ABBREVIATIONS

CDMA Code-Division Multiple Access
CPE Customer Premises Equipment

DMT Discrete Multi-Tone
DSLAM Digital Subscriber Line Access Module
DSM Dynamic Spectrum Management
FDMA Frequency-division Multiple Access
FFT Fast-Fourier Transformation
FITC Fiber-To-The-Curb
NEXT Near-End cross talk
QAM Quadrature Amplitude Modulation
QLN Quiet Line Noise
SIR Signal-to-Interference Ratio
SNR Signal-to-Noise Ratio
TDMA Time-division Multiple Access

The invention claimed is:

1. A data processing method, which comprises:
    processing first data utilizing a first frequency range;
    identifying lines that interfere with one another; and
    distributing the first data utilizing a first frequency range over second data utilizing a second frequency range according to mutually orthogonal pseudo-random codes for those lines that show significant interference by switching discrete multitone symbols on and off.

2. The method according to claim 1, wherein the first data are distributed according to an initial pseudo-random code.

3. The method according to claim 2, wherein the initial pseudo-random code is a code arranged in a binary tree hierarchical structure.

4. The method according to claim 3, which comprises prioritizing a portion of the first data associated with a certain hierarchical stage of the pseudo-random code.

5. The method according to claim 1, which comprises defining significant interference as a value of interference above a given threshold value.

6. The method according to claim 1, wherein the first data comprises data distributed over a plurality of lines and/or ports.

7. The method according to claim 6, wherein the lines or ports are associated with a line-card or with a digital subscriber line access multiplexer.

8. A data processing device, comprising:
    a unit configured to execute thereon the method according to claim 1.

9. The device according to claim 8, wherein said unit is a communications device or said unit is associated with a communication device.

10. The device according to claim 9, wherein said unit is a line card or a digital subscriber line access multiplexer.

11. A communication system, comprising data processing device configured to execute thereon the method according to claim 1.

* * * * *